United States Patent
Lee et al.

(10) Patent No.: US 11,479,267 B2
(45) Date of Patent: Oct. 25, 2022

(54) AUTONOMOUS DRIVING APPARATUS AND METHOD

(71) Applicant: HYUNDAI MOBIS Co., Ltd., Seoul (KR)

(72) Inventors: Hyuk Lee, Yongin-si (KR); Soon Jong Jin, Yongin-si (KR); Byeong Hwan Jeon, Yongin-si (KR); Jun Han Lee, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 148 days.

(21) Appl. No.: 17/009,686

(22) Filed: Sep. 1, 2020

(65) Prior Publication Data
US 2021/0094574 A1 Apr. 1, 2021

(30) Foreign Application Priority Data
Sep. 27, 2019 (KR) .......... 10-2019-0119634

(51) Int. Cl.
*B60W 60/00* (2020.01)
*G01C 21/00* (2006.01)
*B60W 50/02* (2012.01)

(52) U.S. Cl.
CPC .... *B60W 60/0015* (2020.02); *B60W 50/0205* (2013.01); *B60W 60/005* (2020.02); *B60W 60/0027* (2020.02); *G01C 21/38* (2020.08)

(58) Field of Classification Search
CPC .......... B60W 60/0015; B60W 60/005; B60W 60/0027; B60W 50/0205; G01C 21/38; H04W 4/46
See application file for complete search history.

(56) References Cited

U.S. PATENT DOCUMENTS

| | | | |
|---|---|---|---|
| 2008/0208454 A1* | 8/2008 | Pesterev | G01C 21/26 701/467 |
| 2014/0088855 A1* | 3/2014 | Ferguson | G08G 1/166 701/117 |
| 2015/0241880 A1* | 8/2015 | Kim | G08G 1/096791 701/25 |
| 2017/0068243 A1* | 3/2017 | MacCready | G05D 1/104 |
| 2018/0327111 A1* | 11/2018 | Huth | G01M 5/0083 |
| 2021/0063546 A1* | 3/2021 | Slobodyanyuk | G01S 17/931 |

FOREIGN PATENT DOCUMENTS

| | | | |
|---|---|---|---|
| JP | 4876847 B2 | * | 2/2012 |
| KR | 10-1998-0068399 | | 10/1998 |
| KR | 20150060953 | * | 6/2015 |

* cited by examiner

*Primary Examiner* — Vivek D Koppikar
*Assistant Examiner* — Godfrey Aleksander Maciorowski
(74) *Attorney, Agent, or Firm* — H.C. Park & Associates, PLC

(57) ABSTRACT

An autonomous driving apparatus and method for an ego vehicle that autonomously travels includes a first sensor to detect a vehicle nearby the ego vehicle, a memory to store map information, and a processor to control autonomous driving of the ego vehicle based on the nearby vehicle detected by the first sensor and the map information stored in the memory.

9 Claims, 7 Drawing Sheets

AUTONOMOUS DRIVING APPARATUS AND METHOD

CROSS-REFERENCE TO RELATED APPLICATION

This application claims priority from and the benefit of Korean Patent Application No. 10-2019-0119634, filed on Sep. 27, 2019, which is hereby incorporated by reference for all purposes as if set forth herein.

BACKGROUND

Field

Exemplary embodiments relate to an autonomous driving apparatus and method applied to an autonomous vehicle.

Discussion of the Background

Today's automobile industry is moving towards an implementation of autonomous driving to minimize the intervention of a driver in vehicle driving. An autonomous vehicle refers to a vehicle that autonomously determines a driving path by recognizing a nearby environment using an external information detection and processing function upon driving and independently travels using its own motive power.

The autonomous vehicle can autonomously travel up to a destination while preventing a collision against an obstacle on a driving path and controlling a vehicle speed and driving direction based on a shape of a road although a driver does not manipulate a steering wheel, an acceleration pedal or a brake. For example, the autonomous vehicle may perform acceleration in a straight road, and may perform deceleration while changing a driving direction in accordance with the curvature of a curved road in the curved road.

In order to guarantee the safe driving of an autonomous vehicle, the driving of the autonomous vehicle needs to be controlled based on a measured driving environment by precisely measuring the driving environment using sensors mounted on the vehicle and continuing to monitor the driving state of the vehicle. To this end, various sensors such as a LIDAR sensor, a radar sensor, an ultrasonic sensor and a camera sensor, that is, sensors for detecting nearby objects such as nearby vehicles, pedestrians and fixed facilities, are applied to the autonomous vehicle. Data output by such sensors are used to determine information on a driving environment, for example, state information such as a location, shape, moving direction and moving speed of a nearby object.

Furthermore, the autonomous vehicle also has a function for optimally determining a driving path and driving lane by determining and correcting the location of the vehicle based on previously stored map data, controlling the driving of the vehicle so that the vehicle does not deviate from the determined path and lane, and performing defense and evasion driving for a risk factor in a driving path or a vehicle that suddenly appears nearby.

Background of the Disclosure is disclosed in Korean Patent Application Laid-Open No. 10-1998-0068399 (Oct. 15, 1998).

The above information disclosed in this Background section is only for enhancement of understanding of the background of the invention and, therefore, it may contain information that does not constitute prior art.

SUMMARY

Exemplary embodiments of the present disclosure are directed to the provision of an autonomous driving apparatus and method for improving driving stability and driving accuracy of an autonomous vehicle by precisely diagnosing the reliability of autonomous driving control over the autonomous vehicle.

In an embodiment, an autonomous driving apparatus for an ego vehicle that autonomously travels, the autonomous driving apparatus includes: a first sensor to detect a vehicle nearby the ego vehicle, a memory to store map information, and a processor to control autonomous driving of the ego vehicle based on the nearby vehicle detected by the first sensor and the map information stored in the memory. The processor is configured to: generate an actual driving trajectory of the nearby vehicle based on driving information of the nearby vehicle detected by the first sensor and generate an expected driving trajectory of the nearby vehicle based on the map information stored in the memory; perform a first diagnosis of autonomous driving control over the ego vehicle by comparing the generated actual driving trajectory and the generated expected driving trajectory; perform a second diagnosis of the autonomous driving control over the ego vehicle by applying, to a predefined classification model, a first sensing value obtained through the first sensor, the map information stored in the memory, a second sensing value obtained through a second sensor mounted on the nearby vehicle, and map information applied to the nearby vehicle; and maintain or stop the autonomous driving control over the ego vehicle based on results of the first and second diagnoses.

The processor may be configured to perform the first diagnosis based on an amount of a trajectory error between the actual driving trajectory and expected driving trajectory of the nearby vehicle or a cumulative addition of the trajectory errors.

The processor may be configured to determine that the autonomous driving control over the ego vehicle is unreliable, when the amount of the trajectory error reaches or exceeds a preset first threshold value within a preset first critical time.

The first diagnosis may include a first reliability diagnosis, the second diagnosis may include a second reliability diagnosis, and the processor may be further configured to perform the first reliability diagnosis and the second reliability diagnosis based on the cumulative addition of the trajectory errors when the amount of the trajectory error is less than the first threshold value for the first critical time.

The processor may be configured to determine that the autonomous driving control over the ego vehicle is unreliable, when a cumulative addition of accumulated and added trajectory errors reaches or exceeds a preset second threshold value within a second critical time, the second critical time being preset as a value greater than the first critical time, when the amount of the trajectory error is less than the first threshold value for the first critical time.

The predefined classification model used in the second diagnosis may be defined to diagnose reliability of the autonomous driving control over the ego vehicle by taking into consideration a first deviation between the first and second sensing values for the same reference object, and a second deviation between first and second location values of the same reference object, the first location value being present in the map information stored in the memory and the second location value being present in the map information applied to the nearby vehicle.

The processor may be configured to: maintain the autonomous driving control over the ego vehicle when both the first and second diagnoses are satisfied, and stop the autonomous driving control over the ego vehicle when at least one of the first and second diagnoses are not satisfied.

The nearby vehicle may include at least two surrounding vehicles.

In an embodiment, an autonomous driving method for an ego vehicle, the autonomous driving method includes the steps of: controlling autonomous driving of the ego vehicle based on a nearby vehicle detected by a first sensor and map information stored in a memory; generating an actual driving trajectory of the nearby vehicle based on driving information of the nearby vehicle detected by the first sensor and generating an expected driving trajectory of the nearby vehicle based on the map information stored in the memory; performing a first diagnosis of autonomous driving control over the ego vehicle by comparing the generated actual driving trajectory and the generated expected driving trajectory; performing a second diagnosis of the autonomous driving control over the ego vehicle by applying, to a predefined classification model, a first sensing value obtained through the first sensor, the map information stored in the memory, a second sensing value obtained through a second sensor mounted on the nearby vehicle, and map information applied to the nearby vehicle, and maintaining or stopping the autonomous driving control over the ego vehicle based on results of the first and second diagnoses.

The step of performing of the first diagnosis may include the step of performing a first reliability diagnosis based on an amount of a trajectory error between the actual driving trajectory and expected driving trajectory of the nearby vehicle or a cumulative addition of the trajectory errors.

The step of performing the first reliability diagnosis may include the step of determining that the autonomous driving control over the ego vehicle is unreliable, when the amount of the trajectory error reaches or exceeds a preset first threshold value within a preset first critical time.

The step of performing the first reliability diagnosis may further include the step of performing the reliability diagnosis based on the cumulative addition of the trajectory errors when the amount of the trajectory error is less than the first threshold value for the first critical time.

The step of performing the first reliability diagnosis may include the step of determining that the autonomous driving control over the ego vehicle is unreliable, when a cumulative addition of accumulated and added trajectory errors reaches or exceeds a preset second threshold value within a second critical time, the second critical time being preset as a value greater than the first critical time, when the amount of the trajectory error is less than the first threshold value for the first critical time.

The predefined classification model used in the second diagnosis may be defined to diagnose reliability of the autonomous driving control over the ego vehicle by taking into consideration a first deviation between the first and second sensing values for an identical reference object, and a second deviation between first and second location values of the identical reference object, the first location value being present in the map information stored in the memory and the second location value being present in the map information applied to the nearby vehicle.

The step of maintaining or stopping the autonomous driving control may include the steps of maintaining the autonomous driving control over the ego vehicle when both the first and second diagnoses are satisfied, and stopping the autonomous driving control over the ego vehicle when at least one of the first and second diagnoses are not satisfied.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
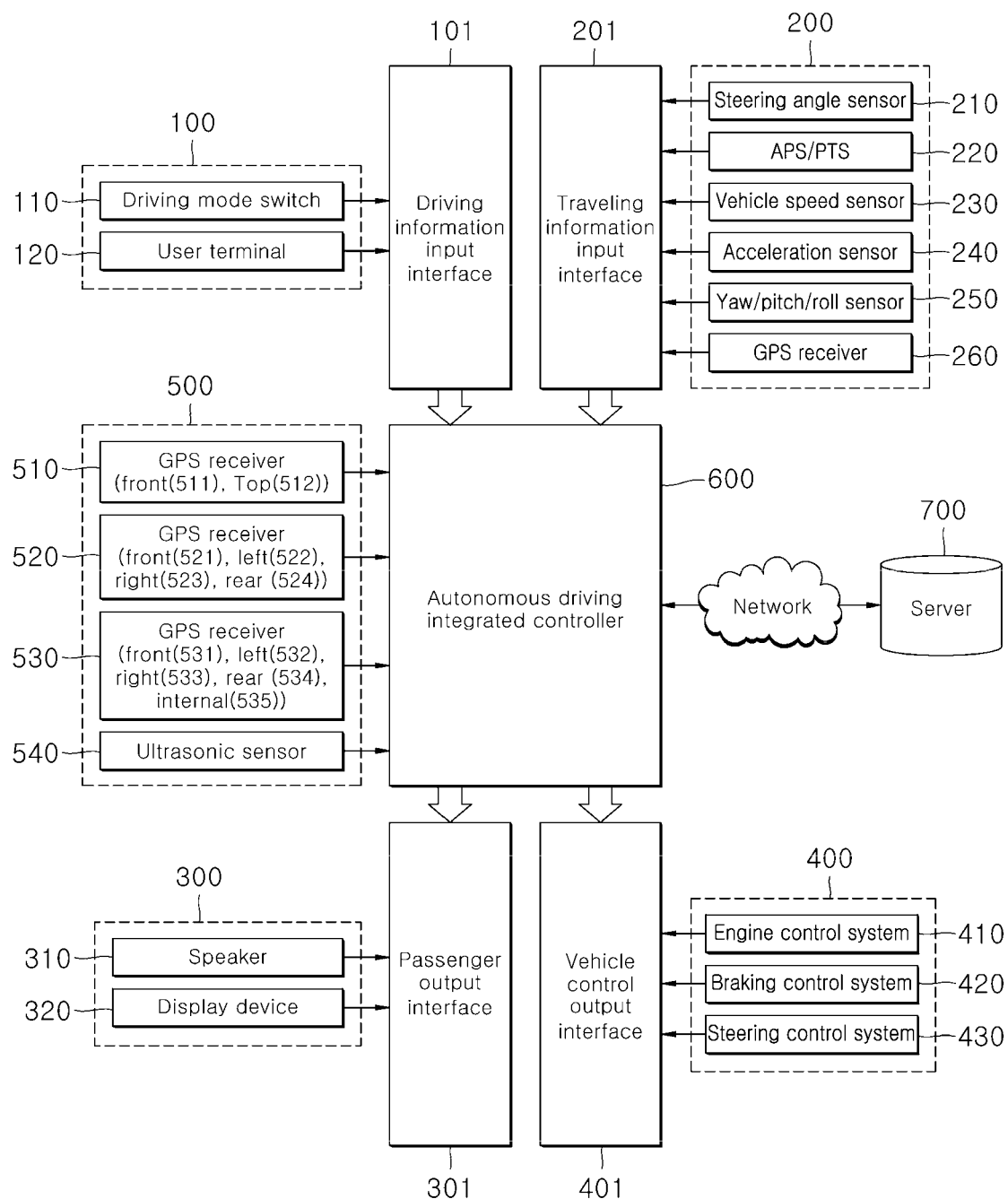
FIG. 1 is a general block diagram of an autonomous driving control system to which an autonomous driving apparatus according to an embodiment of the present disclosure may be applied.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Figure 2:
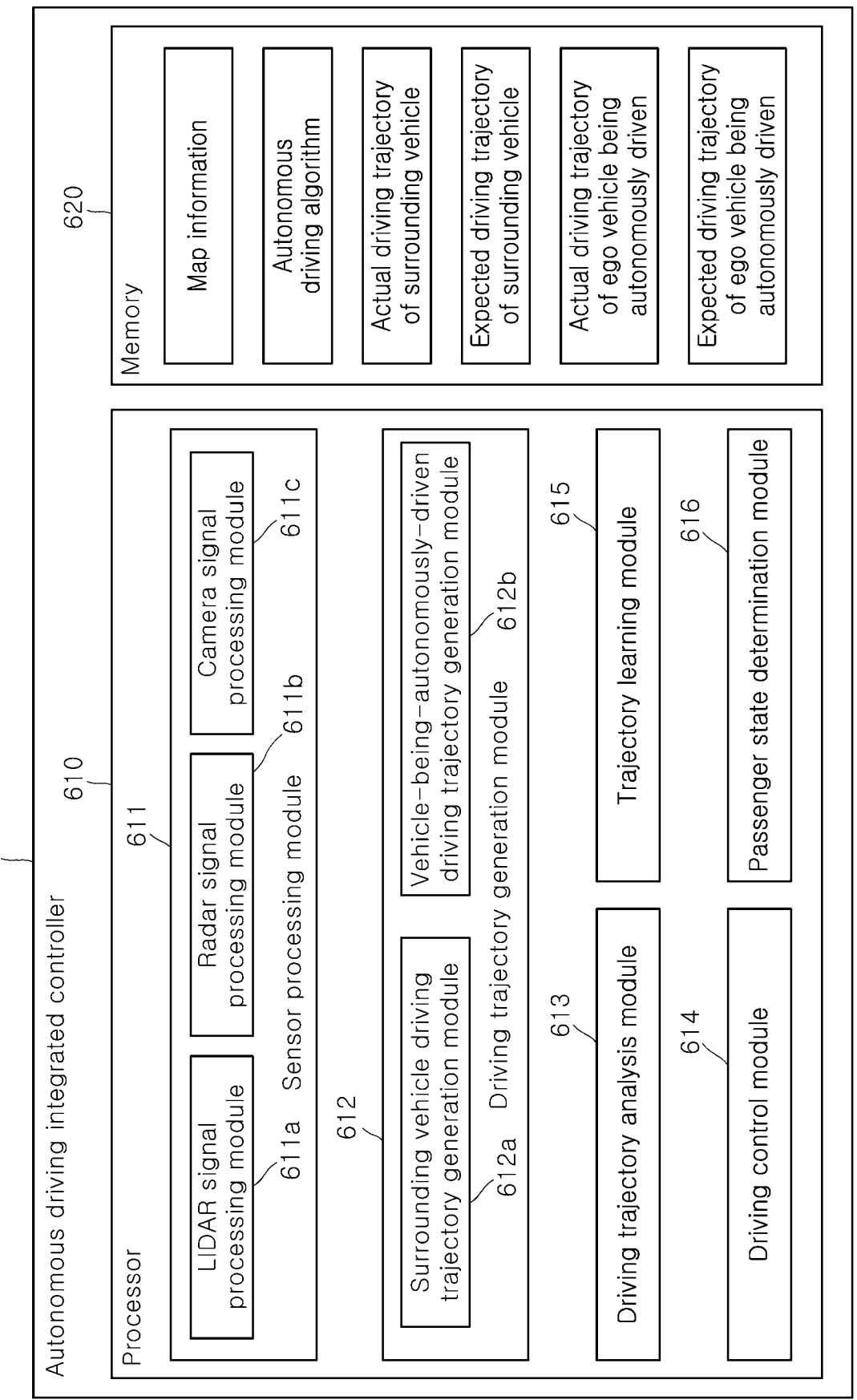
FIG. 2 is a block diagram illustrating a detailed configuration of an autonomous driving integrated controller in the autonomous driving apparatus according to an embodiment of the present disclosure.
Figure 3:
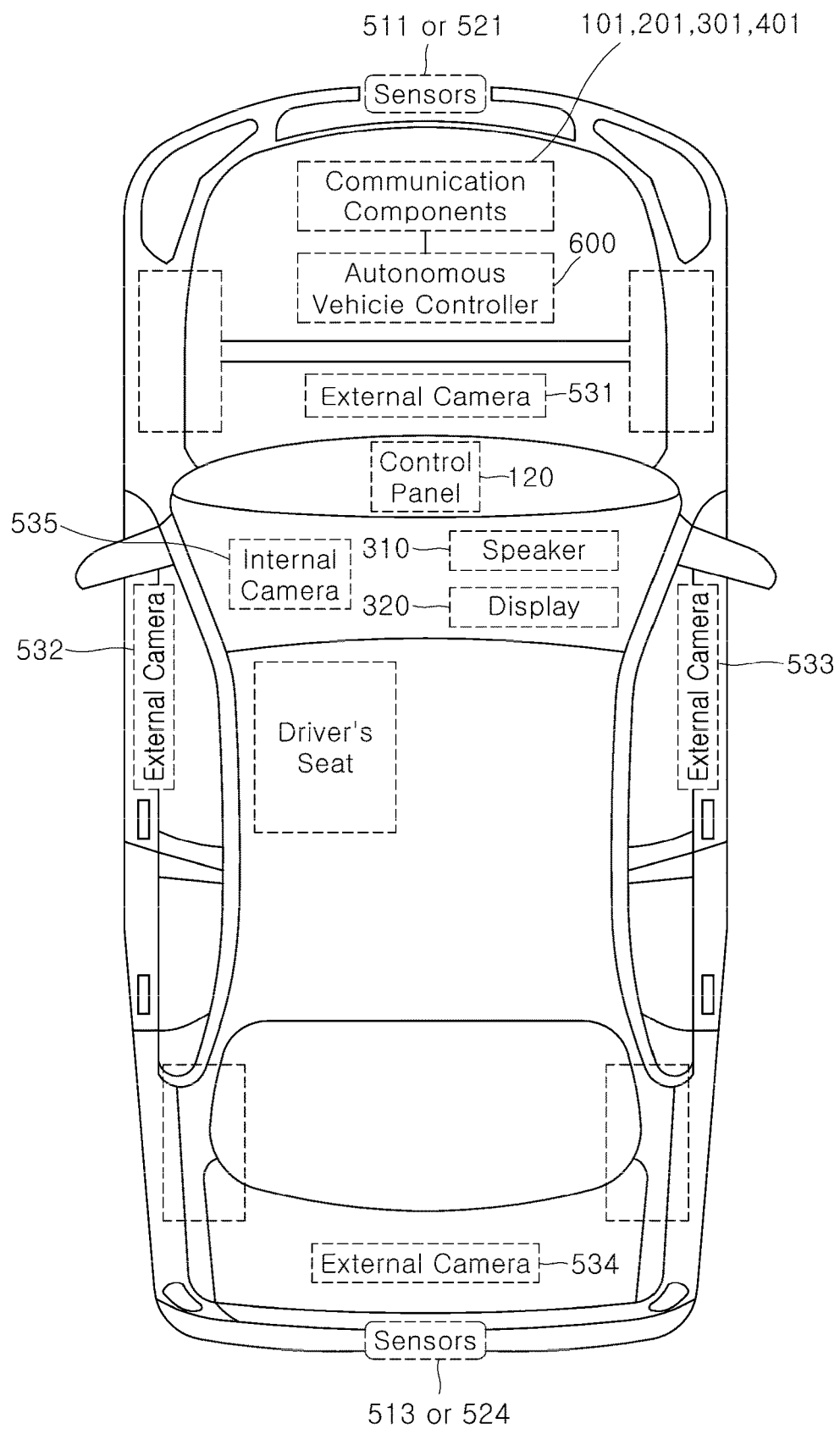
FIG. 3 is an exemplary diagram illustrating an example in which the autonomous driving apparatus according to an embodiment of the present disclosure is applied to a vehicle.
Figure 4:
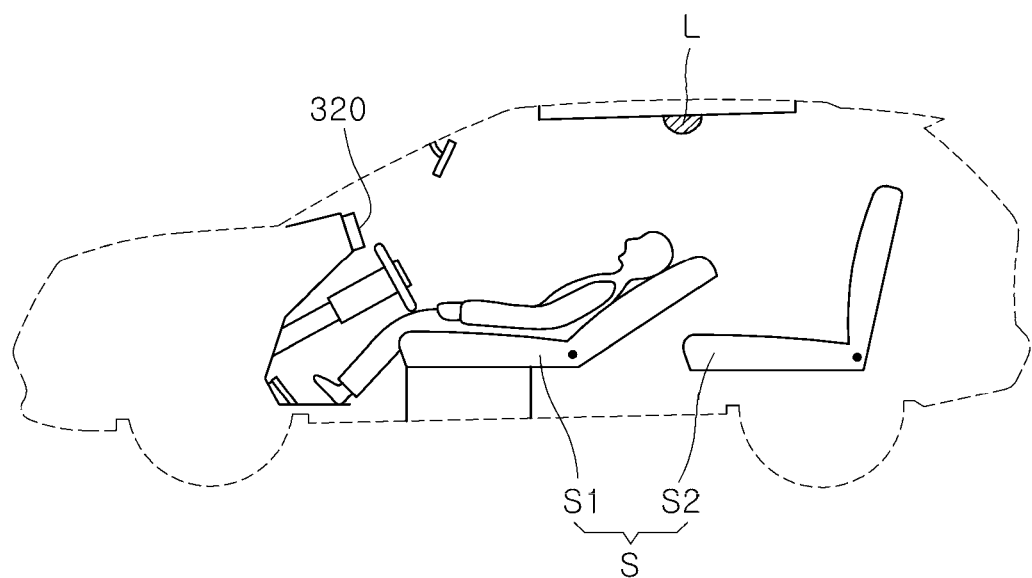
FIG. 4 is an exemplary diagram illustrating an example of an internal structure of a vehicle to which the autonomous driving apparatus according to an embodiment of the present disclosure is applied.
Figure 5:
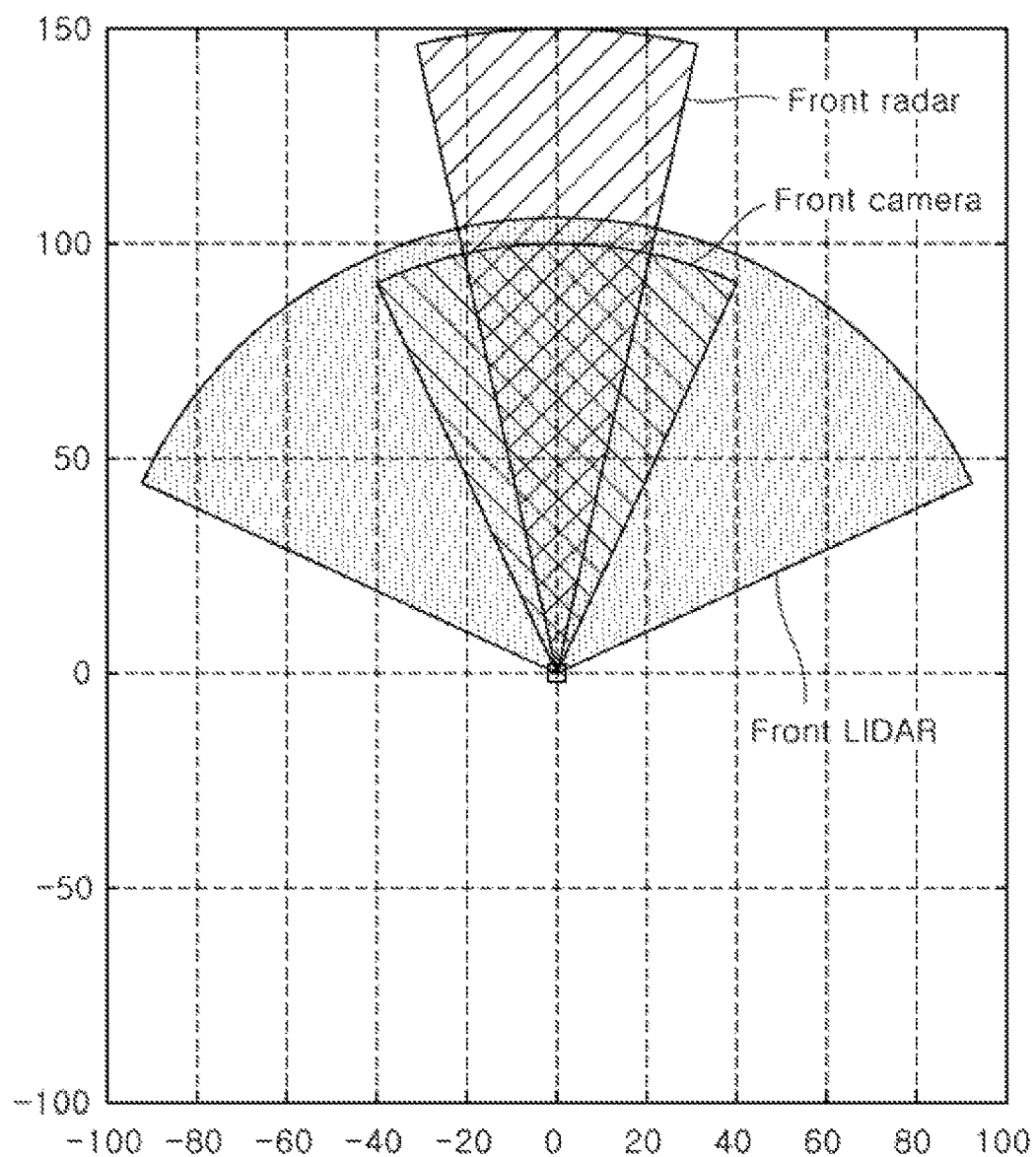
FIG. 5 is an exemplary diagram illustrating an example of a set distance and horizontal field of view within which a LIDAR sensor, a radar sensor and a camera sensor may detect a nearby object in the autonomous driving apparatus according to an embodiment of the present disclosure.
Figure 6:
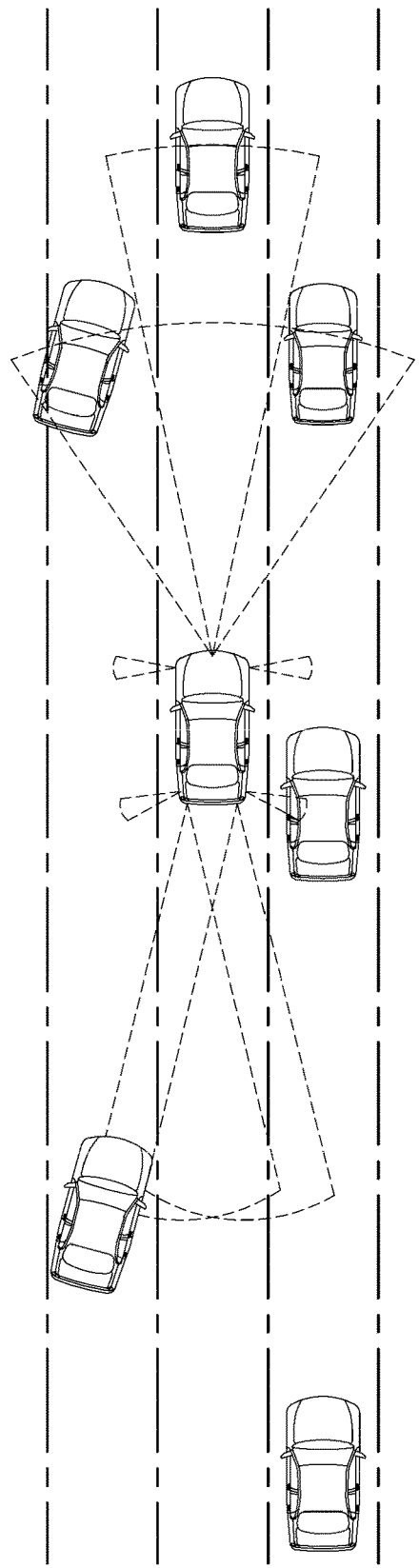
FIG. 6 is an exemplary diagram illustrating an example in which a sensor unit detects a nearby vehicle in the autonomous driving apparatus according to an embodiment of the present disclosure.

FIG. 1 is a general block diagram of an autonomous driving control system to which an autonomous driving apparatus according to an embodiment of the present disclosure may be applied. FIG. 2 is a block diagram illustrating a detailed configuration of an autonomous driving integrated controller in the autonomous driving apparatus according to an embodiment of the present disclosure. FIG. 3 is an exemplary diagram illustrating an example in which the autonomous driving apparatus according to an embodiment of the present disclosure is applied to a vehicle. FIG. 4 is an exemplary diagram illustrating an example of an internal structure of a vehicle to which the autonomous driving apparatus according to an embodiment of the present disclosure is applied. FIG. 5 is an exemplary diagram illustrating an example of a set distance and horizontal field of view within which a LIDAR sensor, a radar sensor and a camera sensor may detect a nearby object in the autonomous driving apparatus according to an embodiment of the present disclosure. FIG. 6 is an exemplary diagram illustrating an example in which a sensor unit detects a nearby vehicle in the autonomous driving apparatus according to an embodiment of the present disclosure.

First, the structure and functions of an autonomous driving control system to which an autonomous driving apparatus according to the present embodiment may be applied are described with reference to FIGS. 1 and 3. As illustrated in FIG. 1, the autonomous driving control system may be implemented based on an autonomous driving integrated controller 600 configured to transmit and receive data necessary for autonomous driving control of a vehicle through a driving information input interface 101, a traveling information input interface 201, an occupant output interface 301 and a vehicle control output interface 401.

The autonomous driving integrated controller 600 may obtain, through the driving information input interface 101, driving information based on a manipulation of an occupant for a user input unit 100 in an autonomous driving mode or manual driving mode of a vehicle. As illustrated in FIG. 1, the user input unit 100 may include a driving mode switch 110 and a user terminal 120 (e.g., a navigation terminal mounted on a vehicle or a smartphone or tablet PC owned by an occupant), for example. Accordingly, driving information may include driving mode information and navigation information of a vehicle. For example, a driving mode (i.e., an autonomous driving mode/manual driving mode or a sport mode/eco mode/safe mode/normal mode) of a vehicle determined by a manipulation of an occupant for the driving mode switch 110 may be transmitted to the autonomous driving integrated controller 600 through the driving information input interface 101 as the driving information. Furthermore, navigation information, such as the destination of an occupant and a path up to the destination (e.g., the shortest path or preference path, selected by the occupant, among candidate paths up to the destination) input by an occupant through the user terminal 120, may be transmitted to the autonomous driving integrated controller 600 through the driving information input interface 101 as the driving information. The user terminal 120 may be implemented as a control panel (e.g., touch screen panel) that provides a user interface (UI) through which a driver inputs or modifies information for autonomous driving control of a vehicle. In this case, the driving mode switch 110 may be implemented as a touch button on the user terminal 120.

Furthermore, the autonomous driving integrated controller 600 may obtain traveling information indicative of a driving state of a vehicle through the traveling information input interface 201. The traveling information may include a steering angle formed when an occupant manipulates a steering wheel, an acceleration pedal stroke or brake pedal stroke formed when an acceleration pedal or brake pedal is stepped on, and various types of information indicative of driving states and behaviors of a vehicle, such as a vehicle speed, acceleration, a yaw, a pitch and a roll, that is, behaviors formed in the vehicle. The pieces of traveling information may be detected by a traveling information detection unit 200, including a steering angle sensor 210, an acceleration position sensor (APS)/pedal travel sensor (PTS) 220, a vehicle speed sensor 230, an acceleration sensor 240, and a yaw/pitch/roll sensor 250, as illustrated in FIG. 1. Furthermore, the traveling information of a vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201, and may be used to control the driving of a vehicle in the autonomous driving mode or manual driving mode of the vehicle.

Furthermore, the autonomous driving integrated controller 600 may transmit, to an output unit 300, driving state information, provided to an occupant, through the occupant output interface 301 in the autonomous driving mode or manual driving mode of a vehicle. That is, the autonomous driving integrated controller 600 transmits driving state information of a vehicle to the output unit 300 so that an occupant can check the autonomous driving state or manual driving state of the vehicle based on the driving state information output through the output unit 300. The driving state information may include various types of information indicative of driving states of a vehicle, such as a current driving mode, transmission range and vehicle speed of the vehicle, for example. Furthermore, if it is determined that it is necessary to warn a driver in the autonomous driving mode or manual driving mode of a vehicle along with the driving state information, the autonomous driving integrated controller 600 transmits warning information to the output unit 300 through the occupant output interface 301 so that the output unit 300 can output a warning to the driver. In order to output such driving state information and warning information acoustically and visually, the output unit 300 may include a speaker 310 and a display 320 as illustrated in FIG. 1. In this case, the display 320 may be implemented as the same device as the user terminal 120 or may be implemented as an independent device separated from the user terminal 120.

Furthermore, the autonomous driving integrated controller 600 may transmit control information for driving control of a vehicle to a low-ranking control system 400, applied to a vehicle, through the vehicle control output interface 401 in the autonomous driving mode or manual driving mode of the vehicle. As illustrated in FIG. 1, the low-ranking control system 400 for driving control of a vehicle may include an engine control system 410, a braking control system 420 and a steering control system 430. The autonomous driving integrated controller 600 may transmit engine control information, braking control information and steering control information, as the control information, to the respective low-ranking control systems 410, 420 and 430 through the vehicle control output interface 401. Accordingly, the engine control system 410 may control the vehicle speed and acceleration of a vehicle by increasing or decreasing fuel supplied to an engine. The braking control system 420 may control the braking of the vehicle by controlling braking power of the vehicle. The steering control system 430 may control the steering of the vehicle through a steering apparatus (e.g., motor driven power steering (MDPS) system) applied to the vehicle.

As described above, the autonomous driving integrated controller 600 according to the present embodiment may obtain driving information based on a manipulation of a driver and traveling information indicative of a driving state of a vehicle through the driving information input interface 101 and the traveling information input interface 201, respectively, may transmit, to the output unit 300, driving state information and warning information, generated based on an autonomous driving algorithm processed by a processor 610 therein, through the occupant output interface 301, and may transmit, to the low-ranking control system 400, control information, generated based on the autonomous driving algorithm processed by the processor 610, through the vehicle control output interface 401 so that driving control of the vehicle is performed.

In order to guarantee stable autonomous driving of a vehicle, it is necessary to continuously monitor a driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of a vehicle, such as a nearby vehicle, pedestrian, road or fixed facility (e.g., a signal light, a signpost, a traffic sign or a construction fence). As used herein, multiple nearby objects may be "surrounding objects" if they surround all or part of the outer periphery of an ego vehicle, such as shown in FIG. 6. A vehicle being autonomously controlled is known in the art as an "ego" vehicle. The sensor unit 500 may include one or more of a LIDAR sensor 510, a radar sensor 520 and a camera sensor 530 in order to detect a nearby object outside a vehicle, as illustrated in FIG. 1.

The LIDAR sensor 510 may transmit a laser signal to the periphery of a vehicle, and may detect a nearby object outside the vehicle by receiving a signal reflected and returned from a corresponding object. The LIDAR sensor 510 may detect a nearby object located within the ranges of a set distance, set vertical field of view and set horizontal field of view, which are predefined depending on its specifications. The LIDAR sensor 510 may include a front LIDAR sensor 511, a top LIDAR sensor 512 and a rear LIDAR sensor 513 installed at the front, top and rear of a vehicle, respectively, but the installation location of each sensor and the number of sensors installed are not limited to a specific embodiment. A threshold for determining the validity of a laser signal reflected and returned from a corresponding object may be previously stored in a memory 620 of the autonomous driving integrated controller 600. The processor 610 of the autonomous driving integrated controller 600 may determine a location (including a distance to a corresponding object), speed and moving direction of the corresponding object using a method of measuring the time taken for a laser signal, transmitted through the LIDAR sensor 510, to be reflected and returned from the corresponding object.

The radar sensor 520 may radiate electromagnetic waves around a vehicle, and may detect a nearby object outside the vehicle by receiving a signal reflected and returned from a corresponding object. The radar sensor 520 may detect a nearby object within the ranges of a set distance, set vertical field of view and set horizontal field of view, which are predefined depending on its specifications. The radar sensor 520 may include a front radar sensor 521, a left radar sensor 522, a right radar sensor 523 and a rear radar sensor 524 installed at the front, left, right and rear of a vehicle, respectively, but the installation location of each sensor and the number of sensors installed are not limited to a specific embodiment. The processor 610 of the autonomous driving integrated controller 600 may determine a location (including a distance to a corresponding object), speed and moving direction of the corresponding object using a method of analyzing power of electromagnetic waves transmitted and received through the radar sensor 520.

The camera sensor 530 may detect a nearby object outside a vehicle by photographing the periphery of the vehicle, and may detect a nearby object within the ranges of a set distance, set vertical field of view and set horizontal field of view, which are predefined depending on its specifications. The camera sensor 530 may include a front camera sensor 531, a left camera sensor 532, a right camera sensor 533 and a rear camera sensor 534 installed at the front, left, right and rear of a vehicle, respectively, but the installation location of each sensor and the number of sensors installed are not limited to a specific embodiment. The processor 610 of the autonomous driving integrated controller 600 may determine a location (including a distance to a corresponding object), speed and moving direction of the corresponding object by applying predefined image processing to an image captured by the camera sensor 530. Furthermore, an internal camera sensor 535 for photographing the inside of a vehicle may be mounted at a given location (e.g., rear view mirror) within the vehicle. The processor 610 of the autonomous driving integrated controller 600 may monitor a behavior and state of an occupant based on an image captured by the internal camera sensor 535, and may output guidance or a warning to the occupant through the output unit 300.

As illustrated in FIG. 1, the sensor unit 500 may further include an ultrasonic sensor 540 in addition to the LIDAR sensor 510, the radar sensor 520 and the camera sensor 530, and may further adopt various types of sensors for detecting a nearby object of a vehicle along with the sensors. FIG. 3 illustrates an example in which in order to help understanding of the present embodiment, the front LIDAR sensor 511 or the front radar sensor 521 is installed at the front of a vehicle, the rear LIDAR sensor 513 or the rear radar sensor 524 is installed at the rear of the vehicle, and the front camera sensor 531, the left camera sensor 532, the right camera sensor 533 and the rear camera sensor 534 are installed at the front, left, right and rear of the vehicle, respectively. However, as described above, the installation location of each sensor and the number of sensors installed are not limited to a specific embodiment. FIG. 5 illustrates an example of a set distance and horizontal field of view within which the LIDAR sensor 510, the radar sensor 520 and the camera sensor 530 may detect a nearby object ahead of the vehicle. FIG. 6 illustrates an example in which each sensor detects a nearby object. FIG. 6 is merely an example of the detection of a nearby object. A method of detecting a nearby object is determined by the installation location of each sensor and the number of sensors installed. A nearby vehicle and a nearby object in the omni-directional area of an ego vehicle may be detected depending on the configuration of the sensor unit 500.

Furthermore, in order to determine a state of an occupant within a vehicle, the sensor unit 500 may further include a microphone and bio sensor for detecting a voice and bio signal (e.g., heart rate, electrocardiogram, respiration, blood pressure, body temperature, electroencephalogram, photoplethysmography (or pulse wave) and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor and a blood sugar sensor.

FIG. 4 illustrates an example of an internal structure of a vehicle. An internal device whose state is controlled by a manipulation of an occupant, such as a driver or fellow passenger of a vehicle, and which supports driving or convenience (e.g., rest or entertainment activities) of the occupant may be installed within the vehicle. Such an internal device may include a vehicle seat S in which an occupant is seated, a lighting device L such as an internal light and a mood lamp, the user terminal 120, the display 320, and an internal table. The state of the internal device may be controlled by the processor 610.

The angle of the vehicle seat S may be adjusted by the processor 610 (or by a manual manipulation of an occupant). If the vehicle seat S is configured with a front row seat S1 and a back row seat S2, only the angle of the front row seat S1 may be adjusted. If the back row seat S2 is not provided and the front row seat S1 is divided into a seat structure and a footstool structure, the front row seat S1 may be implemented so that the seat structure of the front row seat S1 is physically separated from the footstool structure and the angle of the front row seat S1 is adjusted. Furthermore, an actuator (e.g., motor) for adjusting the angle of the vehicle seat S may be provided. The on and off of the lighting device L may be controlled by the processor 610 (or by a manual manipulation of an occupant). If the lighting device L includes a plurality of lighting units such as an internal light and a mood lamp, the on and off of each of the lighting units may be independently controlled. The angle of the user terminal 120 or the display 320 may be adjusted by the processor 610 (or by a manual manipulation of an occupant) based on an angle of field of an occupant. For example, the angle of the user terminal 120 or the display 320 may be adjusted so that a screen thereof is placed in an occupant's gaze direction. In this case, an actuator (e.g., motor) for adjusting the angle of the user terminal 120 and the display 320 may be provided.

As illustrated in FIG. 1, the autonomous driving integrated controller 600 may communicate with a server 700 over a network. Various communication methods, such as a wide area network (WAN), a local area network (LAN) or a personal area network (PAN), may be adopted as a network method between the autonomous driving integrated controller 600 and the server 700. Furthermore, in order to secure wide network coverage, a low power wide area network (LPWAN, including commercialized technologies such as LoRa, Sigfox, Ingenu, LTE-M and NB-IOT, that is, networks having very wide coverage, among the IoT) communication method may be adopted. For example, a LoRa (capable of low power communication and also having wide coverage of a maximum of about 20 Km) or Sigfox (having coverage of 10 Km (downtown) to 30 Km (in the outskirt area outside the downtown area) according to environments) communication method may be adopted. Furthermore, LTE network technologies based on 3rd generation partnership project (3GPP) Release 12, 13, such as machine-type communications (LTE-MTC) (or LTE-M), narrowband (NB) LTE-M, and NB IoT having a power saving mode (PSM), may be adopted. The server 700 may provide the latest map information (may correspond to various types of map information, such as two-dimensional (2-D) navigation map data, three-dimensional (3-D) manifold map data or 3-D high-precision electronic map data). Furthermore, the server 700 may provide various types of information, such as accident information, road control information, traffic volume information and weather information in a road. The autonomous driving integrated controller 600 may update map information, stored in the memory 620, by receiving the latest map information from the server 700, may receive accident information, road control information, traffic volume information and weather information, and may use the information for autonomous driving control of a vehicle.

The structure and functions of the autonomous driving integrated controller 600 according to the present embodiment are described with reference to FIG. 2. As illustrated in FIG. 2, the autonomous driving integrated controller 600 may include the processor 610 and the memory 620.

The memory 620 may store basic information necessary for autonomous driving control of a vehicle or may store information generated in an autonomous driving process of a vehicle controlled by the processor 610. The processor 610 may access (or read) information stored in the memory 620, and may control autonomous driving of a vehicle. The memory 620 may be implemented as a computer-readable recording medium, and may operate in such a way to be accessed by the processor 610. Specifically, the memory 620 may be implemented as a hard drive, a magnetic tape, a memory card, a read-only memory (ROM), a random access memory (RAM), a digital video disc (DVD) or an optical data storage, such as an optical disk.

The memory 620 may store map information that is required for autonomous driving control by the processor 610. The map information stored in the memory 620 may be a navigation map (or a digital map) that provides information on a road basis, but may be implemented as a precise road map that provides road information on a lane basis, that is, 3-D high-precision electronic map data, in order to improve the precision of autonomous driving control. Accordingly, the map information stored in the memory 620 may provide dynamic and static information necessary for autonomous driving control of a vehicle, such as a lane, the center line of a lane, a regulation lane, a road boundary, the center line of a road, a traffic sign, a road mark, the shape and height of a road, and a lane width.

Furthermore, the memory 620 may store the autonomous driving algorithm for autonomous driving control of a vehicle. The autonomous driving algorithm is an algorithm (recognition, determination and control algorithm) for recognizing the periphery of an autonomous vehicle, determining the state of the periphery thereof, and controlling the driving of the vehicle based on a result of the determination. The processor 610 may perform active autonomous driving control for a nearby environment of a vehicle by executing the autonomous driving algorithm stored in the memory 620.

The processor 610 may control autonomous driving of a vehicle based on the driving information and the traveling information received from the driving information input interface 101 and the traveling information input interface 201, respectively, the information on a nearby object detected by the sensor unit 500, and the map information and the autonomous driving algorithm stored in the memory 620. The processor 610 may be implemented as an embedded processor, such as a complex instruction set computer (CICS) or a reduced instruction set computer (RISC), or a dedicated semiconductor circuit, such as an application-specific integrated circuit (ASIC).

In the present embodiment, the processor 610 may control autonomous driving of an ego vehicle by analyzing the driving trajectory of the ego vehicle and the driving trajectory of a nearby vehicle. To this end, as illustrated in FIG. 2, the processor 610 may include a sensor processing module 611, a driving trajectory generation module 612, a driving trajectory analysis module 613, a driving control module 614, a trajectory learning module 615 and an occupant state determination module 616. FIG. 2 illustrates each of the modules as an independent block based on its function, but the modules may be integrated into a single module and implemented as an element for integrating and performing the functions of the modules.

The sensor processing module 611 may determine traveling information of a nearby vehicle (i.e., includes the location of the nearby vehicle, and may further include the speed and moving direction of the nearby vehicle along with the location) based on a result of detecting, by the sensor unit 500, the nearby vehicle around an ego vehicle. That is, the sensor processing module 611 may determine the location of a nearby vehicle based on a signal received through the LIDAR sensor 510, may determine the location of a nearby vehicle based on a signal received through the radar sensor 520, may determine the location of a nearby vehicle based on an image captured by the camera sensor 530, and may determine the location of a nearby vehicle based on a signal received through the ultrasonic sensor 540. To this end, as illustrated in FIG. 1, the sensor processing module 611 may include a LIDAR signal processing module 611a, a radar signal processing module 611b and a camera signal processing module 611c. In some embodiments, an ultrasonic signal processing module (not illustrated) may be further added to the sensor processing module 611. An implementation method of the method of determining the location of a nearby vehicle using the LIDAR sensor 510, the radar sensor 520 and the camera sensor 530 is not limited to a specific embodiment. Furthermore, the sensor processing module 611 may determine attribute information, such as the size and type of a nearby vehicle, in addition to the location, speed and moving direction of the nearby vehicle. An algorithm for determining the information, such as the location, speed, moving direction, size and type of a nearby vehicle, may be predefined.

The driving trajectory generation module 612 may generate an actual driving trajectory and expected driving trajectory of a nearby vehicle and an actual driving trajectory of an ego vehicle. To this end, as illustrated in FIG. 2, the driving trajectory generation module 612 may include a nearby vehicle driving trajectory generation module 612a and an ego vehicle driving trajectory generation module 612b.

First, the nearby vehicle driving trajectory generation module 612a may generate an actual driving trajectory of a nearby vehicle.

Specifically, the nearby vehicle driving trajectory generation module 612a may generate an actual driving trajectory of a nearby vehicle based on traveling information of the nearby vehicle detected by the sensor unit 500 (i.e., the location of the nearby vehicle determined by the sensor processing module 611). In this case, in order to generate the actual driving trajectory of the nearby vehicle, the nearby vehicle driving trajectory generation module 612a may refer to map information stored in the memory 620, and may generate the actual driving trajectory of the nearby vehicle by making cross reference to the location of the nearby vehicle detected by the sensor unit 500 and a given location in the map information stored in the memory 620. For example, when a nearby vehicle is detected at a specific point by the sensor unit 500, the nearby vehicle driving trajectory generation module 612a may specify a currently detected location of the nearby vehicle in map information stored in the memory 620 by making cross reference to the detected location of the nearby vehicle and a given location in the map information. The nearby vehicle driving trajectory generation module 612a may generate an actual driving trajectory of a nearby vehicle by continuously monitoring the location of the nearby vehicle as described above. That is, the nearby vehicle driving trajectory generation module 612a may generate an actual driving trajectory of a nearby vehicle by mapping the location of the nearby vehicle, detected by the sensor unit 500, to a location in map information, stored in the memory 620, based on the cross reference and accumulating the location.

An actual driving trajectory of a nearby vehicle may be compared with an expected driving trajectory of the nearby vehicle to be described later to be used to determine whether map information stored in the memory 620 is accurate. In this case, if an actual driving trajectory of a specific nearby vehicle is compared with an expected driving trajectory thereof, there may be a problem in that it is erroneously determined that map information stored in the memory 620 is inaccurate although the map information is accurate. For example, if actual driving trajectories and expected driving trajectories of multiple nearby vehicles are the same and an actual driving trajectory and expected driving trajectory of a specific nearby vehicle are different, when only the actual driving trajectory of the specific nearby vehicle is compared with the expected driving trajectory thereof, it may be erroneously determined that map information stored in the memory 620 is inaccurate although the map information is accurate. In order to prevent this problem, it is necessary to determine whether the tendency of actual driving trajectories of a plurality of nearby vehicles gets out of an expected driving trajectory. To this end, the nearby vehicle driving trajectory generation module 612a may generate the actual driving trajectory of each of the plurality of nearby vehicles. Furthermore, if it is considered that a driver of a nearby vehicle tends to slightly move a steering wheel left and right during his or her driving process for the purpose of straight-line path driving, an actual driving trajectory of the nearby vehicle may be generated in a curved form, not a straight-line form. In order to compute an error between expected driving trajectories to be described later, the nearby vehicle driving trajectory generation module 612a may generate an actual driving trajectory in a straight-line form by applying a given smoothing scheme to the original actual driving trajectory generated in a curved form. Various schemes, such as interpolation for each location of a nearby vehicle, may be adopted as the smoothing scheme.

Furthermore, the nearby vehicle driving trajectory generation module 612a may generate an expected driving trajectory of a nearby vehicle based on map information stored in the memory 620.

As described above, the map information stored in the memory 620 may be 3-D high-precision electronic map data. Accordingly, the map information may provide dynamic and static information necessary for autonomous driving control of a vehicle, such as a lane, the center line of a lane, a regulation lane, a road boundary, the center line of a road, a traffic sign, a road mark, a shape and height of a road, and a lane width. If it is considered that a vehicle commonly travels in the middle of a lane, it may be expected that a nearby vehicle that travels around an ego vehicle will also travel in the middle of a lane. Accordingly, the nearby vehicle driving trajectory generation module 612a may generate an expected driving trajectory of the nearby vehicle as the center line of a lane incorporated into map information.

The ego vehicle driving trajectory generation module 612b may generate an actual driving trajectory of an ego vehicle that has been driven so far based on the traveling information of the ego vehicle obtained through the traveling information input interface 201.

Specifically, the ego vehicle driving trajectory generation module 612b may generate an actual driving trajectory of an ego vehicle by making cross reference to a location of the ego vehicle obtained through the traveling information input interface 201 (i.e., information on the location of the ego vehicle obtained by the GPS receiver 260) and a given location in map information stored in the memory 620. For example, the ego vehicle driving trajectory generation module 612b may specify a current location of an ego vehicle, in map information, stored in the memory 620, by making cross reference to a location of the ego vehicle, obtained through the traveling information input interface 201, and a given location in the map information. As described above, the ego vehicle driving trajectory generation module 612b may generate an actual driving trajectory of the ego vehicle by continuously monitoring the location of the ego vehicle. That is, the ego vehicle driving trajectory generation module 612b may generate the actual driving trajectory of the ego vehicle by mapping the location of the ego vehicle, obtained through the traveling information input interface 201, to a location in the map information stored in the memory 620, based on the cross reference and accumulating the location.

Furthermore, the ego vehicle driving trajectory generation module 612b may generate an expected driving trajectory up to the destination of an ego vehicle based on map information stored in the memory 620.

That is, the ego vehicle driving trajectory generation module 612b may generate the expected driving trajectory up to the destination based on a current location of the ego vehicle obtained through the traveling information input interface 201 (i.e., information on the current location of the ego vehicle obtained through the GPS receiver 260) and the map information stored in the memory 620. Like the expected driving trajectory of the nearby vehicle, the expected driving trajectory of the ego vehicle may be generated as the center line of a lane incorporated into the map information stored in the memory 620.

The driving trajectories generated by the nearby vehicle driving trajectory generation module 612a and the ego vehicle driving trajectory generation module 612b may be stored in the memory 620, and may be used for various purposes in a process of controlling, by the processor 610, autonomous driving of the ego vehicle.

The driving trajectory analysis module 613 may diagnose current reliability of autonomous driving control over an ego vehicle by analyzing driving trajectories (i.e., an actual driving trajectory and expected driving trajectory of a nearby vehicle and an actual driving trajectory of the ego vehicle) that are generated by the driving trajectory generation module 612 and stored in the memory 620. The diagnosis of the reliability of autonomous driving control may be performed in a process of analyzing a trajectory error between the actual driving trajectory and expected driving trajectory of the nearby vehicle.

The driving control module 614 may perform a function for controlling autonomous driving of an ego vehicle. Specifically, the driving control module 614 may process the autonomous driving algorithm synthetically based on the driving information and the traveling information received through the driving information input interface 101 and the traveling information input interface 201, respectively, the information on a nearby object detected by the sensor unit 500, and the map information stored in the memory 620, may transmit the control information to the low-ranking control system 400 through the vehicle control output interface 401 so that the low-ranking control system 400 controls autonomous driving of an ego vehicle, and may transmit the driving state information and warning information of the ego vehicle to the output unit 300 through the occupant output interface 301 so that a driver can recognize the driving state information and warning information. Furthermore, when controlling such autonomous driving in an integrated manner, the driving control module 614 controls the autonomous driving by taking into consideration the driving trajectories of an ego vehicle and a nearby vehicle, which have been analyzed by the sensor processing module 611, the driving trajectory generation module 612 and the driving trajectory analysis module 613, thereby improving the precision of autonomous driving control and enhancing the safety of autonomous driving control.

The trajectory learning module 615 may perform learning or corrections on an actual driving trajectory of an ego vehicle generated by the ego vehicle driving trajectory generation module 612b. For example, when a trajectory error between an actual driving trajectory and expected driving trajectory of a nearby vehicle is a preset threshold or more, the trajectory learning module 615 may determine that an actual driving trajectory of an ego vehicle needs to be corrected by determining that map information stored in the memory 620 is inaccurate. Accordingly, the trajectory learning module 615 may determine a lateral shift value for correcting the actual driving trajectory of the ego vehicle, and may correct the driving trajectory of the ego vehicle.

The occupant state determination module 616 may determine a state and behavior of an occupant based on a state and bio signal of the occupant detected by the internal camera sensor 535 and the bio sensor. The state of the occupant determined by the occupant state determination module 616 may be used for autonomous driving control over an ego vehicle or in a process of outputting a warning to the occupant.

Hereinafter, an embodiment in which the reliability of autonomous driving control over an ego vehicle that autonomously travels is diagnosed is described based on the aforementioned contents. In the present embodiment, reliability diagnosis of autonomous driving control may be divided into a first reliability diagnosis and a second reliability diagnosis. The first and second reliability diagnosis processes are sequentially described.

First, the first reliability diagnosis process is described. As described above, (the driving trajectory generation module 612 of) the processor 610 according to the present embodiment may generate an actual driving trajectory of a nearby vehicle based on driving information of the nearby vehicle detected by the sensor unit 500. That is, when the sensor unit 500 detects a nearby vehicle at a specific point, the processor 610 may specify the current location of the detected nearby vehicle in map information by making cross-reference to the location of the detected nearby vehicle and a location in the map information stored in the memory 620, and may generate an actual driving trajectory of the nearby vehicle by continuously monitoring the location of the nearby vehicle as described above.

Furthermore, (the driving trajectory generation module 612 of) the processor 610 may generate an expected driving trajectory of the nearby vehicle based on the map information stored in the memory 620. In this case, the processor 610 may generate the expected driving trajectory of the nearby vehicle as the center line of a lane incorporated into the map information.

When the actual driving trajectory and expected driving trajectory of the nearby vehicle are generated, (the driving trajectory analysis module 613 of) the processor 610 may perform reliability diagnosis of autonomous driving control over an ego vehicle based on the size of a trajectory error between the actual driving trajectory and expected driving trajectory of the nearby vehicle or a cumulative addition of the trajectory errors.

Specifically, the state in which a trajectory error between the actual driving trajectory and expected driving trajectory of the nearby vehicle is present may correspond to the state in which the autonomous driving control performed on the ego vehicle is unreliable. That is, if an error is present between the actual driving trajectory generated based on driving information of the nearby vehicle detected by the sensor unit 500 and the expected driving trajectory generated based on map information stored in the memory 620, this means the state in which the nearby vehicle does not travel along the center line of a lane in the map information that the nearby vehicle is expected to travel. This means that there is the possibility that the nearby vehicle might be erroneously detected by the sensor unit 500 or the possibility that the map information stored in the memory 620 may be inaccurate. That is, two possibilities may be present. First, although a nearby vehicle actually travels based on an expected driving trajectory, an error may occur in an actual driving trajectory of the nearby vehicle due to the abnormality of the sensor unit 500. Second, the map information stored in the memory 620 and the state of a road on which the nearby vehicle now travels may not be matched (e.g., the nearby vehicles travel in a shifted lane because the lane has shifted to the left or right compared to the map information, stored in the memory 620, due to a construction or re-maintenance on a road on which the nearby vehicle now travels). Accordingly, the processor 610 may perform the diagnosis of reliability of autonomous driving control over the ego vehicle based on the size of a trajectory error between the actual driving trajectory and expected driving trajectory of the nearby vehicle or a cumulative addition of the trajectory errors. Furthermore, as described above, in order to take into consideration an overall driving tendency of the nearby vehicle, trajectory errors between actual driving trajectories and expected driving trajectories of a plurality of nearby vehicles, not an actual driving trajectory of any specific nearby vehicle, may be taken into consideration.

A process of performing, by the processor 610, the diagnosis of reliability based on a trajectory error between an actual driving trajectory and expected driving trajectory of a nearby vehicle is described in detail. First, when the state in which the size of a trajectory error is a preset first threshold value or more occurs within a preset first critical time, the processor 610 may determine that autonomous driving control over an ego vehicle is unreliable.

In this case, the first critical time means a time preset to diagnose the reliability of the autonomous driving control. Timing, that is, a criterion for the time, may be timing at which a comparison between the actual driving trajectory and expected driving trajectory of the nearby vehicle is initiated by the processor 610. Specifically, a process of generating, by the processor 610, the actual driving trajectory and expected driving trajectory of the nearby vehicle, calculating a trajectory error between the actual driving trajectory and the expected driving trajectory, and diagnosing the reliability of autonomous driving control may be periodically executed in a preset determination cycle in order to reduce the resource of the memory 620 and a computational load of the processor 610 (accordingly, the actual driving trajectory and expected driving trajectory of the nearby vehicle stored in the memory 620 may be periodically deleted in the determination cycle). In this case, when the state in which the size of the trajectory error is the first threshold value or more occurs before the first critical time elapses from timing at which any one cycle was initiated, the processor 610 may determine that the autonomous driving control is unreliable. The size of the first critical time, which is a value smaller than the size of the temporal section of the determination cycle, may be designed in various ways depending on a designer's intention and stored in the memory 620. Furthermore, the first threshold value may be designed in various ways depending on a designer's intention and stored in the memory 620.

Furthermore, the processor 610 may additionally perform the reliability diagnosis based on the cumulative addition of the trajectory errors while the size of the trajectory error is less than the first threshold value for the first critical time. That is, although the size of the trajectory error is less than the first threshold value for the first critical time, when an accumulated and added value of the trajectory errors less than the first threshold value is a given value or more, the state of the nearby vehicle corresponds to the state in which in spite of the small degree of error, the nearby vehicle has traveled for a given time with deviating from the expected driving trajectory. Accordingly, the processor 610 can more precisely determine whether the autonomous driving control over the ego vehicle is reliable, by additionally performing the reliability diagnosis based on the cumulative addition of the trajectory errors.

In this case, in the state in which the size of the trajectory error is less than the first threshold value for the first critical time, when the state in which a cumulative addition of accumulated and added trajectory errors (i.e., an accumulated and added value of the trajectory errors within one cycle) is the preset second threshold value or more occurs within a second critical time preset as a value greater than the first critical time, the processor 610 may determine that the autonomous driving control over the ego vehicle is unreliable. In this case, the second critical time, which is a value greater than the first critical time and smaller than the size of a temporal section of the determination cycle, may be previously stored in the memory 620. Furthermore, the second threshold value may be designed in various ways depending on a designer's intention and stored in the memory 620.

Next, the second reliability diagnosis process is described. The processor 610 may perform the second reliability diagnosis of autonomous driving control over the ego vehicle by applying, to a predefined classification model, a first sensing value obtained through the sensor unit 500, map information stored in the memory 620 of the ego vehicle, a second sensing value obtained through a sensor mounted on the nearby vehicle, and map information applied to the nearby vehicle.

In this case, the classification model may have been defined to diagnose the reliability of the autonomous driving control over the ego vehicle by taking into consideration a deviation between the first and second sensing values for the same reference object and a deviation between a first location value of the same reference object in the map information (hereinafter, referred to as "first map information") stored in the memory 620 and a second location value of the same reference object in the map information (hereinafter, referred to as "second map information") applied to the nearby vehicle.

That is, if the first sensing value obtained through the sensor unit 500 of the ego vehicle and the map information obtained from the memory 620 of the ego vehicle are normal, a deviation between the first sensing value (or location value) for the same reference object and the second sensing value (or location value) for the same reference object received from the nearby vehicle is an allowable value or less. Likewise, a deviation between the first location value of the same reference object in the first map information and the second location value of the same reference object in the second map information is an allowable value or less.

Accordingly, after the classification model to which the algorithm has been applied is previously defined in the processor 610, the validity of the first sensing value and the first map information may be verified by applying, to the classification model, the first sensing value that is obtained in real time, the first location value based on the first map information, the second sensing value, and the second location value based on the second map information, thus diagnosing the reliability of autonomous driving control over the ego vehicle.

After the first and second reliability diagnoses are completed, the processor 610 may maintain or stop the autonomous driving control over the ego vehicle based on the results of the first and second reliability diagnoses. That is, if both the first and second reliability diagnoses are satisfied, the processor 610 may determine that a factor to cause an error of the autonomous driving control is not now present, and may maintain the autonomous driving control over the ego vehicle. If one or more of the first and second reliability diagnoses are not satisfied, the processor 610 may stop the autonomous driving control over the ego vehicle in order to prevent erroneous control over autonomous driving.

Figure 7:
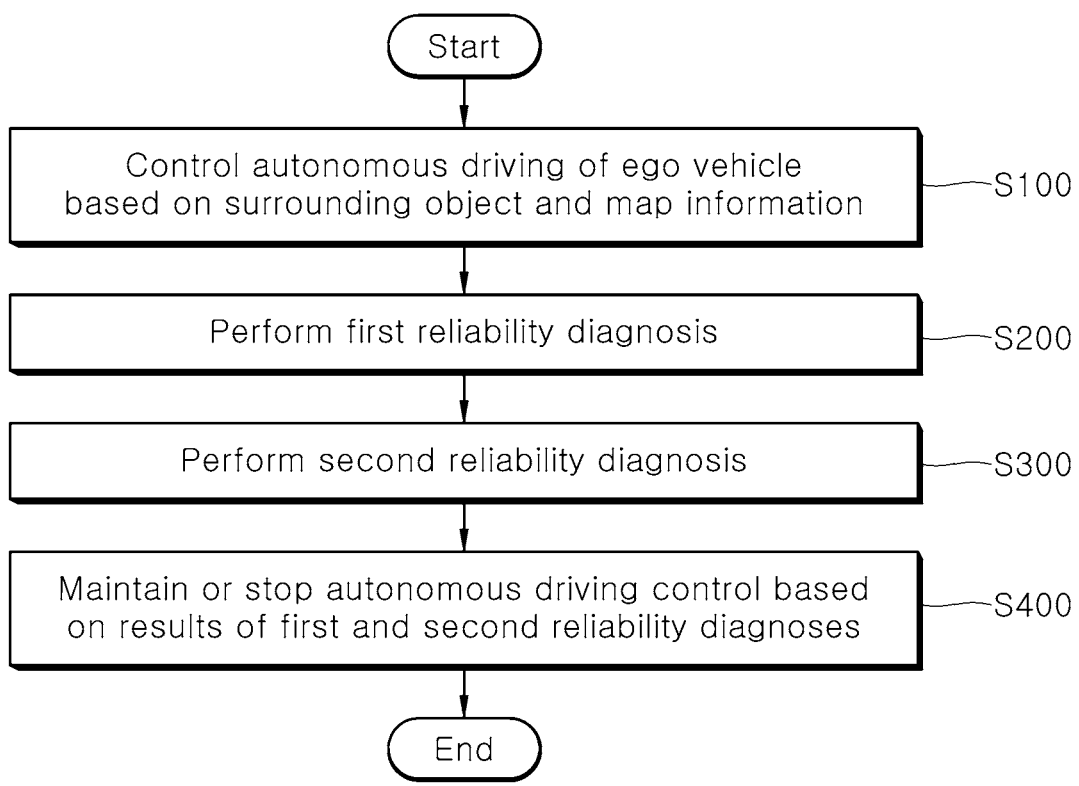
FIG. 7 is a flowchart for describing an autonomous driving method according to an embodiment of the present disclosure.

FIG. 7 is a flowchart for describing an autonomous driving method according to an embodiment of the present disclosure.

The autonomous driving method according to an embodiment of the present disclosure is described with reference to FIG. 7. First, the processor 610 controls autonomous driving of an ego vehicle based on a nearby object detected by the sensor unit 500 and map information stored in the memory 620 (S100).

Thereafter, the processor 610 generates an actual driving trajectory of a nearby vehicle based on driving information of the nearby vehicle detected by the sensor unit 500, generates an expected driving trajectory of the nearby vehicle based on the map information stored in the memory 620, and performs a first reliability diagnosis of autonomous driving control over the ego vehicle by comparing the generated actual driving trajectory and the generated expected driving trajectory (S200).

At step S200, the processor 610 performs the first reliability diagnosis based on the size of a trajectory error between the actual driving trajectory and expected driving trajectory of the nearby vehicle or a cumulative addition of the trajectory errors. Specifically, when the state in which the size of the trajectory error is a preset first threshold value or more occurs within a preset first critical time, the processor 610 determines that the autonomous driving control over the ego vehicle is unreliable. Furthermore, the processor 610 may additionally perform a reliability diagnosis based on a cumulative addition of the trajectory errors in the state in which the size of the trajectory error is less than the first threshold value for the first critical time. In this case, when the state in which a cumulative addition of accumulated and added trajectory errors is a preset second threshold value or more occurs within a second critical time, preset as a value greater than the first critical time, in the state in which the size of the trajectory error is less than the first threshold value for the first critical time, the processor 610 determines that the autonomous driving control over the ego vehicle is unreliable.

The processor 610 performs a second reliability diagnosis of the autonomous driving control over the ego vehicle by applying, to the predefined classification model, a first sensing value obtained through the sensor unit 500, the map information stored in the memory 620, a second sensing value obtained through a sensor mounted on the nearby vehicle, and map information applied to the nearby vehicle (S300).

The classification model used at step S300 may have been defined to diagnose the reliability of the autonomous driving control over the ego vehicle by taking into consideration a deviation between first and second sensing values for the same reference object and a deviation between a first location value of the same reference object in the map information stored in the memory 620 and a second location value of the same reference object in the map information applied to the nearby vehicle.

Step S200 and step S300 are elements that are performed in parallel, and an operation sequence thereof is not limited to the described sequence.

After step S200 and step S300 are completed, the processor 610 maintains or stops the autonomous driving control over the ego vehicle based on the results of the first and second reliability diagnoses (S400). At step S400, the processor 610 maintains the autonomous driving control over the ego vehicle when both the first and second reliability diagnoses are satisfied, and stops the autonomous driving control over the ego vehicle when one or more of the first and second reliability diagnoses are not satisfied.

As described above, according to the present embodiment, whether to maintain or stop autonomous driving control over an autonomous vehicle is determined by superimposing and performing a first reliability diagnosis of diagnosing the reliability of the autonomous driving control based on an error between an actual driving trajectory and expected driving trajectory of a nearby vehicle around the autonomous vehicle and a second reliability diagnosis of diagnosing the reliability of the autonomous driving control using a given classification model. Accordingly, driving stability and driving accuracy of an autonomous vehicle can be improved by more precisely determining the reliability of autonomous driving control which is being currently performed.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An autonomous driving apparatus for an ego vehicle that autonomously travels, the autonomous driving apparatus comprising:
   a first sensor to detect a vehicle nearby the ego vehicle;
   a memory to store map information; and
   a processor to control autonomous driving of the ego vehicle based on the nearby vehicle detected by the first sensor and the map information stored in the memory, wherein the processor is configured to:
   generate an actual driving trajectory of the nearby vehicle based on driving information of the nearby vehicle detected by the first sensor and generate an expected driving trajectory of the nearby vehicle based on the map information stored in the memory;
   perform a first reliability diagnosis of autonomous driving control over the ego vehicle by comparing the generated actual driving trajectory and the generated expected driving trajectory;
   perform a second reliability diagnosis of the autonomous driving control over the ego vehicle by applying, to a predefined classification model, a first sensing value obtained through the first sensor, the map information stored in the memory, a second sensing value obtained through a second sensor mounted on the nearby vehicle, and map information applied to the nearby vehicle, and
   maintain or stop the autonomous driving control over the ego vehicle based on results of the first and second reliability diagnoses,
   wherein the processor is configured to perform the first reliability diagnosis based on an amount of a trajectory error between the actual driving trajectory and expected driving trajectory of the nearby vehicle or a cumulative addition of the trajectory errors,
   wherein the processor is configured to determine that the autonomous driving control over the ego vehicle is unreliable, when the amount of the trajectory error reaches or exceeds a preset first threshold value within a preset first critical time, and
   wherein the processor is further configured to additionally perform the first reliability diagnosis based on the cumulative addition of the trajectory errors when the amount of the trajectory error is less than the first threshold value for the first critical time.

2. The autonomous driving apparatus of claim 1, wherein the processor is further configured to determine that the autonomous driving control over the ego vehicle is unreliable, when a cumulative addition of accumulated and added trajectory errors reaches or exceeds a preset second threshold value within a second critical time, the second critical time being preset as a value greater than the first critical time, when the amount of the trajectory error is less than the first threshold value for the first critical time.

3. The autonomous driving apparatus of claim 1, wherein the predefined classification model used in the second reliability diagnosis is defined to diagnose reliability of the autonomous driving control over the ego vehicle by taking into consideration a first deviation between the first and second sensing values for an identical reference object, and a second deviation between first and second location values of the identical reference object, the first location value being present in the map information stored in the memory and the second location value being present in the map information applied to the nearby vehicle.

4. The autonomous driving apparatus of claim 1, wherein the processor is configured to:
   maintain the autonomous driving control over the ego vehicle when both the first and second reliability diagnoses are satisfied, and
   stop the autonomous driving control over the ego vehicle when at least one of the first and second reliability diagnoses are not satisfied.

5. The autonomous driving apparatus of claim 1, wherein the nearby vehicle comprises at least two surrounding vehicles.

6. An autonomous driving method for an ego vehicle, the autonomous driving method comprising the steps of:
   controlling autonomous driving of the ego vehicle based on a nearby vehicle detected by a first sensor and map information stored in a memory;
   generating an actual driving trajectory of the nearby vehicle based on driving information of the nearby vehicle detected by the first sensor and generating an expected driving trajectory of the nearby vehicle based on the map information stored in the memory,
   performing a first reliability diagnosis of autonomous driving control over the ego vehicle by comparing the generated actual driving trajectory and the generated expected driving trajectory,
   performing a second reliability diagnosis of the autonomous driving control over the ego vehicle by applying, to a predefined classification model, a first sensing value obtained through the first sensor, the map information stored in the memory, a second sensing value obtained through a second sensor mounted on the nearby vehicle, and map information applied to the nearby vehicle, and
   maintaining or stopping the autonomous driving control over the ego vehicle based on results of the first and second reliability diagnoses
   wherein the step of performing of the first reliability diagnosis comprises the steps of:
   performing a first reliability diagnosis based on an amount of a trajectory error between the actual driving trajectory and expected driving trajectory of the nearby vehicle or a cumulative addition of the trajectory errors,
   determining that the autonomous driving control over the ego vehicle is unreliable, when the amount of the trajectory error reaches or exceeds a preset first threshold value within a preset first critical time, and
   performing additionally the first reliability diagnosis based on the cumulative addition of the trajectory errors when the amount of the trajectory error is less than the first threshold value for the first critical time.

7. The autonomous driving method of claim 6, wherein the step of performing the first reliability diagnosis further comprises the step of determining that the autonomous driving control over the ego vehicle is unreliable, when a cumulative addition of accumulated and added trajectory errors reaches or exceeds a preset second threshold value within a second critical time, the second critical time being preset as a value greater than the first critical time, when the amount of the trajectory error is less than the first threshold value for the first critical time.

8. The autonomous driving method of claim 6, wherein the predefined classification model used in the second reliability diagnosis is defined to diagnose reliability of the autonomous driving control over the ego vehicle by taking into consideration a first deviation between the first and second sensing values for an identical reference object, and a second deviation between first and second location values of the identical reference object, the first location value being present in the map information stored in the memory and the second location value being present in the map information applied to the nearby vehicle.

9. The autonomous driving method of claim 6, wherein the step of maintaining or stopping the autonomous driving control comprises the steps of maintaining the autonomous driving control over the ego vehicle when both the first and second reliability diagnoses are satisfied, and stopping the autonomous driving control over the ego vehicle when at least one of the first and second reliability diagnoses are not satisfied.

\* \* \* \* \*